United States Patent [19]

Britt

[11] 3,759,970

[45] Sept. 18, 1973

[54] THERMAL STABILIZERS FOR SILICONE FLUIDS

[75] Inventor: A. D. Britt, Alexandria, Va.

[73] Assignee: The United States of America as represented by the Secretary of the Navy, Washington, D.C.

[22] Filed: Dec. 10, 1971

[21] Appl. No.: 206,871

Related U.S. Application Data

[63] Continuation-in-part of Ser. No. 12,456, Feb. 18, 1970, abandoned.

[52] U.S. Cl... 260/448.2 R, 260/448.2 E, 252/49.6, 252/78
[51] Int. Cl. ............................ C09k 3/00, C07f 7/08
[58] Field of Search....................... 252/75, 78, 49.6; 260/448.2 E, 448.2 R

[56] References Cited
UNITED STATES PATENTS
3,664,985   5/1972   Britt.......................... 260/448.2 R X Primary Examiner—Leon D. Rosdol
Assistant Examiner—Harry A. Pitlick
Attorney—R. S. Sciascia et al.

[57] ABSTRACT

High temperature stable polysiloxane fluids are produced by reacting the polysiloxane with a fluorinated aromatic amide. About 1.0 percent by weight of the amide is used with the polysiloxane to produce a stabilized fluid requiring up to 6 hours before gelation at 400°C. Such stabilized polysiloxanes are useful in hydraulic systems which are subjected to high temperature environments.

5 Claims, No Drawings

THERMAL STABILIZERS FOR SILICONE FLUIDS

CROSS-REFERENCE TO RELATED APPLICATION

This application is a Continuation-in-Part of application Serial Number 12,456 filed February 18, 1970, now abandoned.

BACKGROUND OF THE INVENTION

This invention relates to thermally stabilized polysiloxane fluids and methods for the preparation thereof. It particularly provides for the addition of fluorinated aromatic amides to liquid polysiloxanes to produce thermally stabilized polysiloxane-based mechanical fluids.

Many of the commercially available polysiloxanes possess thermal and oxidative stable properties which make them useful as mechanical or hydraulic fluids up to temperatures of about 250°C. Above 250°C the fluids are highly susceptible to gelation which thereby critically limits their usefulness. The linear polysiloxanes useful in this invention are of the general formula $(CH_3)_3SiO(RR'SiO)_nSi(CH_3)_3$ where R is a methyl group and R' is a methyl or phenyl group and, n, is an integer of from 15 to 45. It is well known in the prior art that the above formula describes the liquid silicone fluids. See Chemistry of the Silicone by Rochow, N.Y., Wiley, 1946. Generally, the more heavily phenylated the polysiloxane, the more thermally stable it is. Also, the presence of trace impurities are known to be deleterious to thermal stability and tend to catalyze the degradation process.

Iron, cobalt, nickel, and copper soaps have been used to stabilize polysiloxanes and it has been shown that a wide range of other redox metal ions inhibited silicone fluids against oxidation, provided the ions were suitably dispersed or solubilized. One of the more promising redox metals used was cerium, as described in U.S. Pat. No. 3,267,036.

Although it is not clearly understood why polysiloxane liquids decompose to gelatinous solids upon prolonged heating at elevated temperatures, it has been postulated that trace impurities may generate water at temperatures above 300°C and that the water acts as a catalyst in attacking the silicone chain and causing the gel formation. Consequently, the purpose of this invention is to replace the original impurities, which are the generating sources of water, with chemical groups which will not liberate water. Since the main polysiloxane impurities appear to be Si-Cl, Si-H, and SiOH linkages; the chemical species uniquely suited to replace all three is fluoride.

OBJECTS OF THE INVENTION

It is an object of this invention to provide a thermally stable mechanical fluid.

It is also an object of this invention to provide a method for producing a thermally stable mechanical fluid.

A further object of this invention is to provide a class of fluorinated aromatic amides which will delay the decomposition of polysiloxane fluids when processed therewith at elevated temperatures.

Another object of this invention is to provide a polysiloxane-based mechanical fluid which resists the catalytic attack of water at elevated temperatures.

These and other objects will become apparent from the following description and claims.

SUMMARY OF THE INVENTION

The present invention is directed to high temperature polysiloxane-based mechanical fluids and to methods in which they are stabilized by treatment with substances possessing fluoride groups of intermediate activity. Such treatment produces polysiloxane fluids having longer decomposition times at elevated temperatures than the best known prior art. More specifically, the above purposes are accomplished whereby fluorinated aromatic amides are processed with various types of polysiloxanes to replace the impurity groups, within the siloxane chain, with a fluoride grouping. The extent of stabilization varies with temperature and the type of polysiloxane used, however, the general trends observed are that for a given type of polysiloxane, stabilization decreases as temperature increases and the maximum stabilization occurs with a lightly phenylated type of silicone fluid.

This invention is useful in applications requiring a stable silicone oil at elevated temperatures. It is especially useful in hydraulic systems subjected to wide variations in temperature such as in airplane servomechanisms and constant speed drives.

DESCRIPTION OF THE PREFERRED EMBODIMENTS

The silicone fluids used in this invention may be conveniently classified in accordance to their degree of phenylation. Table 1 sets forth the characteristics of the silicone fluids used in this invention.

TABLE 1*

| Type | Designation | $N^{20}$ | Approx. molar ratio, $\phi$/Me | Nominal viscosity at 25° C. (cs.) |
|---|---|---|---|---|
| DC 200 | Dimethylsilicone. | 1.4046 | Non phenylated | 50 |
| DC 510 | Methylphenylsilicone. | 1.4256 | 0.05, light phenylation | 100 |
| DC 550 | do | 1.5041 | 0.35 heavy phenylation | 100 |
| DC 710 | do | 1.5357 | Very heavy phenylation | 300 |

*Baker, O'Rear, Sniegoski, and Kagarise, "Stabilization of Silicone Lubricating Fluids at 300° C. to 400° C. by Soluble Cerium Complexes," NRL Report 6156, Jan. 8, 1965.

The fluorinated amides used in this invention may be characterized by the general formula:

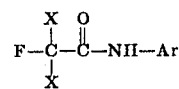

where X represents hydrogen or fluorine and Ar represents an aryl radical containing at least one aromatic ring whereby said rings may have at least one primary or secondary amine attached thereto.

The preferred fluorinated aromatic amides are of the trifluoroacetamide type and are produced from the reaction of trifluoroacetic acid and an aromatic amine.

by visual side-by-side comparisons between discs containing a treated silicone oil of the same type. The following Table II indicates the results.

TABLE II

| | Test silicon | Fluorinated amide | Reaction procedure | Testing temp., °C. | Time to gelation |
|---|---|---|---|---|---|
| Control | DC 200 | | | 400 | 2 min. |
| 1 | DC 200 | 1% trifluoro-acet-(meta)-amino-anilide | Prior synthesis | 400 | 2 min. |
| Control | DC 200 (50 cs.) | | | 300 | 5 min. |
| 2 | DC 200 (50 cs.) | 1% trifluoro-acet-(meta)-amino-anilide | Prior synthesis | 300 | 8 min. |
| Control | DC 200 (50 cs.) | | | 250 | 10 min. |
| 3 | DC 200 (50 cs.) | 1.5% trifluoro-acet-(meta)-amino-anilide | Prior synthesis | 250 | 20 min. |
| Control | DC 510 (100 cs.) | | | | 6–12 min. 1 hr.¹ |
| 4 | DC 510 (100 cs.) | 10% trifluoroacetanilide | Solvent | 400 | 6 hr.² |
| 5 | DC 510 (100 cs.) | 1% trifluoroacetanilide | Prior synthesis | 400 | 3 hr.¹ 6 hr.² |
| 6 | DC 510 (100 cs.) | 10% trifluoroacet-(meta)-amino-anilide | Solvent | 400 | 3 hr.¹ 6 hr.² |
| Control | DC 550 (100 cs.) | | | 400 | ½–1 hr. |
| 7 | DC 550 (100 cs.) | 1% trifluoro-acet-(meta)-amino-anilide | Prior synthesis | 400 | ½ hr. |
| Control | DC 710 (300 cs.) | | | 400 | 2–3 hr. |
| 8 | DC 710 (300 cs.) | 1% trifluoroacetalpha naphthylamide | Prior synthesis | 400 | 2½–3 hr. |

¹ Minimum.   ² Maximum.

Possible variations using difluoroacetic acid and monofluoroacetic acid are not preferred because of their high toxicity and cost. Preferred aromatic amines are aniline, meta-phenylene diamine, and alphanaphthylamine.

It is desirable to first synthesize the fluorinated aromatic amide before processing it with the polysiloxane, however, the synthesis may be carried out with the polysiloxane present. In the latter case a solvent such as acetone or benzene is desirable for mixing purposes. A major disadvantage of the solvent method is that it requires about 10 times more of the reactants than is required with the prior-synthesis technique to obtain the same degree of stabilization.

Exemplary of the solvent procedure is to mix, with 15 volume acetone solvent, 1 volume of organic amine and 1.25 volumes of trifluoroacetic acid. Add 15 volumes of silicone fluid, heat and slowly evaporate the acetone at 50°–60°C. Then increase the temperature and react the mixture with stirring at temperatures above 160°C for one or more hours. Usually temperatures of 180° to 220°C held for 1–2 hours are sufficient.

The preferred prior-synthesis technique is accomplished as follows: Mix equimolar amounts of the trifluoroacetic acid and an aromatic amine and heat at 160°–200°C. React until the pure trifluoroacetamide crystals sublime from the melt. Mix 0.2–5.0 percent by weight of the amide crystals with the silicone fluid and react at temperatures above 160°C for one or more hours. Temperatures of 180°–220°C for 1–2 hours are usually preferred.

Using the above technique, normally only about 0.5–1.5 weight percent of the trifluoroacetamide will be required to obtain the desired solution and the maximum obtainable stabilization. With the solvent technique the reactants necessary to produce an equivalent stabilization amount to a 10 weight percent solution, in addition to the inconvenience of solvent processing.

Testing involved placing one ml samples on thin glass discs which were supported on a hot-plate surface maintained at 400° ± 10°C. Gelation was determined As indicated in Table II, the maximum stabilization appears to occur in the lightly phenylated silicone fluid such as DC 510. It is estimated that DC 510 contains approximately one of the Si-H, Si-Cl, or SiOH impurity linkages per hundred silicone units. The replacement of these impurities with fluorine occurs with relative ease and produces maximum effectiveness compared to the non-phenylated and heavier phenylated types. It is possible that some mechanism other than catalytic water attack occurs with the non-phenylated and heavier phenylated fluids to cause their gelation. Table II shows that decreased stabilization occurred in both the non-phenylated DC-200 and highly phenylated varieties (DC-550 and 710).

What is claimed and desired to be secured by Letters Patent of the United States is:

1. A high temperature hydraulic fluid consisting essentially of a reaction product of a polysiloxane having the general formula $$(CH_3)_3SiO(RR'SiO)_nSi(CH_3)_3$$

where R is a methyl group and R' is a methyl or phenyl group and $n$ is an integer of 15 to 45 reacted for at least 1 hour at temperatures above 160°C with 0.2 percent to 5.0 percent by weight, based on the polysiloxane, of a trifluoroaceto-aryl amide having the general formula $$\begin{array}{c} X \quad O \\ | \quad \| \\ F-C-C-NH-Ar \\ | \\ X \end{array}$$

where X represents fluorine and Ar represents an aryl radical containing at lest one aromatic ring whereby said rings may have at least one primary or secondary amine attached thereto.

2. The fluid of claim 1 wherein the percent of trifluoroaceto-aryl amide reacted is 0.5 to 1.5 percent by weight.

3. The fluid of claim 2 wherein the trifluoroaceto-aryl amide is trifluoroacetanilide.

4. The fluid of claim 2 wherein the trifluoroaceto-aryl amide is trifluoro-acet-(meta)-amino-anilide.

5. The fluid of claim 2 wherein the trifluoroaceto-aryl amide is trifluoro-acet-alpha naphthylamide.

* * * * *